United States Patent [19]

Brown

[11] 4,293,139

[45] Oct. 6, 1981

[54] POWER STEERING PUMP POWERED LOAD LEVELER

[75] Inventor: Arthur K. Brown, South Bend, Ind.

[73] Assignee: The Bendix Corporation, Southfield, Mich.

[21] Appl. No.: 104,597

[22] Filed: Dec. 17, 1979

[51] Int. Cl.³ .............................................. B60G 17/04
[52] U.S. Cl. ..................................... 280/6 H; 280/6.1; 280/707
[58] Field of Search ............... 280/707, 708, 709, 714, 280/6 H, 6.1, 6.11, 6 R; 60/547 R, 548, 593

[56] References Cited

U.S. PATENT DOCUMENTS

| | | | |
|---|---|---|---|
| 2,869,892 | 1/1959 | Sahagian | 280/709 |
| 2,895,744 | 7/1959 | Jackson | 280/708 |
| 3,390,892 | 7/1968 | Van Winsen | 280/6.1 |
| 3,649,044 | 3/1972 | Higginbotham | 280/710 |
| 3,653,676 | 4/1972 | Higginbotham | 280/6 R |
| 3,895,816 | 7/1975 | Takahashi | 280/6 H |
| 4,017,099 | 4/1977 | Hegel | 280/707 |
| 4,128,112 | 12/1978 | Brown | 60/548 |

Primary Examiner—Robert R. Song
Attorney, Agent, or Firm—Paul David Schoenle; Ken C. Decker

[57] ABSTRACT

A vehicle load-leveling system includes a fluid actuated strut connected between the vehicle frame and axle. A piston moves to transfer actuating fluid to the strut in response power steering fluid pressure. A solenoid-controlled spool valve regulates communication of power steering fluid with the piston. Another solenoid-controlled valve assembly controls communication of actuating fluid with the strut. A height sensor cooperates with the solenoids so that selected amounts of actuating fluid are communicated to the strut to maintain the separation of the frame and the axle substantially between a predetermined range.

10 Claims, 2 Drawing Figures

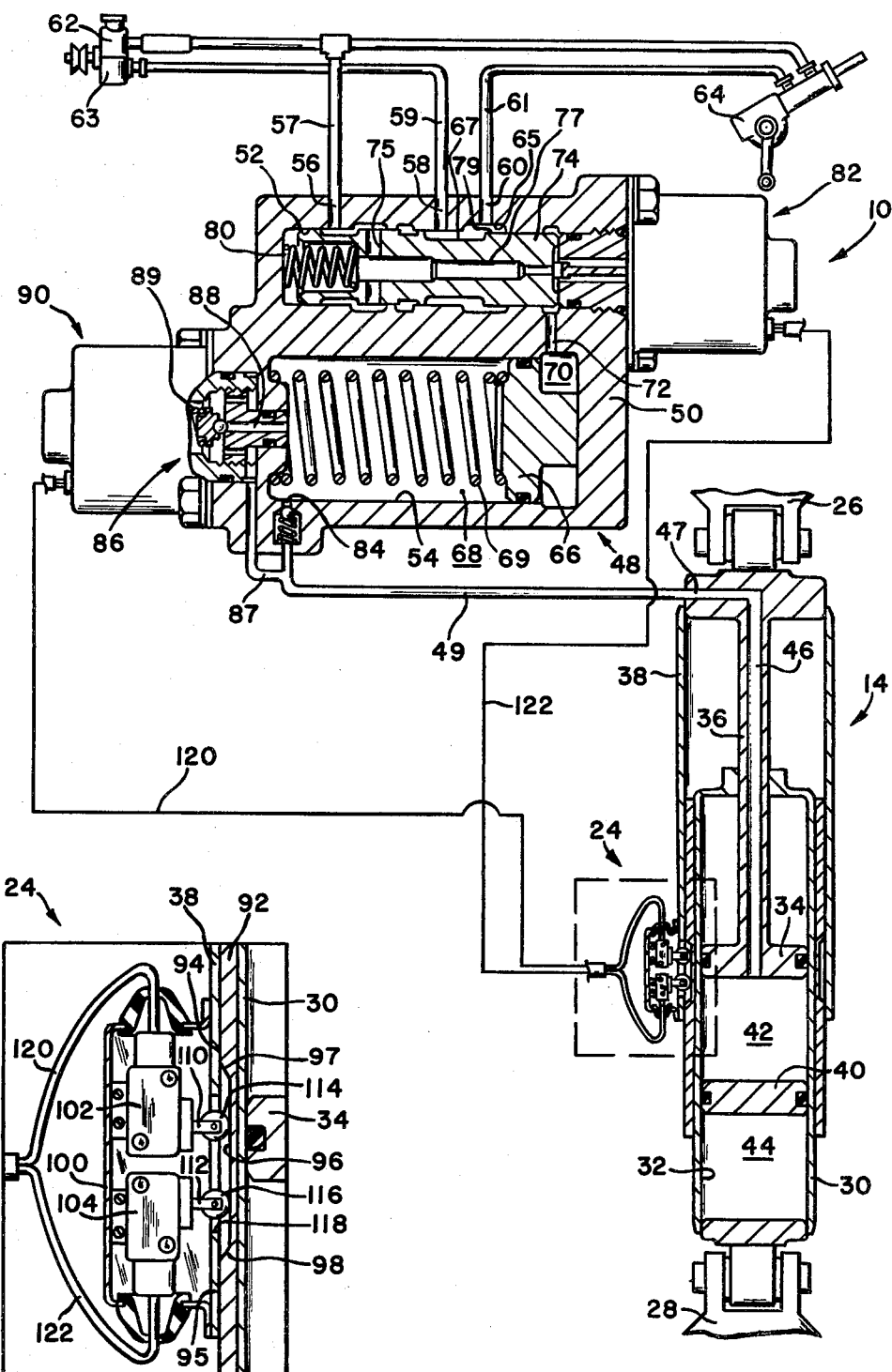

POWER STEERING PUMP POWERED LOAD LEVELER

BACKGROUND OF THE INVENTION

This invention relates to a hydraulic load leveling system for a vehicle.

Vehicle suspension systems permit a serious reduction in the clearance between the rear axle and the frame or body of the vehicle when the vehicle is fully loaded. Auxiliary suspension units, such as coil springs, flat leaf springs, air cylinders and the like, have been used to maintain the clearance between the body and frame. However, many of these units use complex and costly valves, height sensing devices or specialized shock absorber units.

SUMMARY OF THE INVENTION

An advantage of this invention is that my load-leveling system may be powered by a currently available source of vehicular hydraulic fluid pressure, such as a power steering pump.

Another advantage of this invention is that the load-leveling system provided herein can be used with existing standard vehicle shock absorbers.

These advantages are achieved according to the present invention in that a hydraulic load-leveling system is provided with an extendible load-leveling strut connected between the vehicle axle and frame. The strut receives load-leveling fluid from a source powered by the vehicle power steering pump. The source includes a piston exposed on one side to power steering fluid pressure and on the other side to load-leveling fluid. The piston moves to transfer the load-leveling fluid to and from the strut. A solenoid-controlled spool valve controls communication of power steering fluid between the power steering pump and the piston. Another solenoid controlled valve assembly regulates communication of leveling fluid between the piston and the strut. A height sensor is mounted on the strut and includes height sensitive switches operatively connected to the solenoids. The solenoid-controlled valves operate in response to signals received from the height sensor to communicate selected amounts of load-leveling fluid to and from the strut to maintain a substantially constant separation between the vehicle axle and frame.

BRIEF DESCRIPTION OF THE DRAWINGS

FIG. 1 is a partial sectional view of a vehicular load-leveling system according to the applicant's invention;

FIG. 2 is an enlarged view of the circumscribed portion of FIG. 1.

DETAILED DESCRIPTION

Extendible strut 14 is connected between the sprung mass 26, and the unsprung mass 28 of the vehicle. Extendible strut 14 includes an inner housing 30 connected to the unsprung mass 28. A blind bore 32, defined within inner housing 30, slidably and sealingly receives a piston 34 which is connected by rod 36 to outer housing portion 38 and to the sprung mass 25. Blind bore 32 also slidably and sealingly receives diaphragm 40. One side of diaphragm 40 cooperates with piston 34 and housing 30 to define chamber 42 for containing hydraulic load-leveling fluid. The other side of diaphragm 40 cooperates with housing 30 to enclose a compressible gas-filled chamber 44 which provides extendible strut 14 with a resilient quality. A passage 45 which extends through rod 36 and piston 34 to outlet 47 provides for communication of load-leveling fluid between chamber 42 and a source of load-leveling fluid pressure source 48 via conduit 49.

Load-leveling fluid pressure source 48 includes a housing 50 which defines first and second bores 52 and 54. Passage 56, 58 and 60 and conduits 57, 59, and 61 communicate the first bore with a steering fluid reservoir 62, a power steering pump 63 and a steering gear 64, respectively. A piston 66 is sealingly and slidably mounted in second bore 54 and divides bore 54 into a first chamber 68 and a second chamber 70. Housing passage 72 communicates the first bore 52 with the second chamber 70. First chamber 68 contains load leveling fluid for communication with the strut 14 through passage 49. Spring 69 in first chamber 68 urges piston 66 to move to enlarge the volume of first chamber 68 and to reduce the volume of second chamber 70. A spool valve 74 mounted for axial translation within first bore 52 includes radial and axial bores 75 and 77 and lands and slots adapted to cooperate with the wall of first bore 52 to control the flow of power steering fluid between passages 56, 58, 60, and 72. The lands and slots are arranged so as to provide uninterrupted communication of power steering fluid pressure from pump 63 to steering gear 64 via passage 58, slots 67 and 65, and passage 60 regardless of the position of spool valve 74 relative to the housing 50. A spring 80 urges spool valve 74 into a first position shown in FIG. 1, wherein communication is open between reservoir 62 and second chamber 70 via passages 72, 77, and 75, outlet 56 and conduit 57 and wherein communication between pump 63 and second chamber 70 is closed. A solenoid control 82 may be actuated to urge spool valve to the left, viewing FIG. 1, to a second position (not shown) wherein communication is open between pump 63 and steering gear 64, but restricted by land 79, wherein communication is open between pump 63 and second chamber 70 via inlet 58, bores 75 and 77 and passage 72, and wherein communication between reservoir 62 and second chamber 70 is closed. The restriction provided by land 79 causes an increased fluid pressure which is communicated to second chamber 70.

Load-leveling fluid source 48 also includes a pair of valves 84 and 86 which control communication of load-leveling fluid between first chamber 68 and chamber 42 of strut 14. Check valve 84 permits one-way flow of load-leveling fluid from first chamber 68 through check valve 84 and passage 49 to strut 14. Controlled valve 86 is connected to passage 49 by conduit 87 and to first chamber 68 by passage 88. A spring 89 holds valve 86 in the closed position shown in FIG. 1. A solenoid 90 may be actuated to open valve 86.

Height sensor 24 is mounted on the extendible strut 14. Height sensor 24 includes a cylindrical cam member 92 coaxially mounted on the outer surface of inner strut housing 30. The outer surface 94 and 95 of cam member 92 cooperate with the outer strut housing 38 to maintain the inner and outer housing portions 30 and 38 in collinear alignment. An annular groove 96 with bevelled edges 97 and 98 cimcumscribes the cam member 92. Sensor housing 100 is attached to outer strut housing 38. A pair of spring-loaded contact switches 102 and 104 are attached to the sensor housing 100 and are thus fixed to move axially along with outer strut housing 38. Switches 102 and 104 include movable plungers 110 and 112 with rollers 114 and 116 rotatably mounted on the end thereof for rolling engagement with cam member 92 through an opening 118 in outer strut housing 38.

Switch 102 is connected to solenoid 90 by conductor 120 and switch 104 is connected to solenoid 82 by conductor 122.

MODE OF OPERATION

The load-leveling system 10 operates to maintain a substantially constant separation between the sprung mass 26 and the unsprung mass 28 of a vehicle (not shown) by controlling the length of the load-leveling strut 14. Specifically, load-leveling system 10 operates to maintain the strut 14 in a null or neutral position by transferring load-leveling fluid in and out of chamber 42 of the strut 14.

In the neutral position shown in FIGS. 1 and 2 both rollers 114 and 116 of height sensor 24 are located within groove 96, both plungers 110 and 112 are extended and neither switch 102 nor switch 104 is closed. When neither of switches 102 or 104 is closed then both solenoids 82 and 90 are deactivated. With solenoid 82 deactivated, spring 80 moves spool valve 74 to the first position wherein second chamber 70 is communicated with reservoir 62 and wherein communication is closed between power steering pump 63 and second chamber 70, as previously described. This results in reservoir pressure in the second chamber 70 and piston 66 is held by spring 69 in the position shown in FIG. 1, so that no leveling fluid is transferred from first chamber 68 to chamber 42 of strut 14. With solenoid 90 deactivated, spring 89 closes valve 86. Closed valve 86 and check valve 84 prevent leveling fluid from flowing out of chamber 42 of strut 14 and into first chamber 68. Thus, the extension or compression of strut 14 from this neutral position is prevented.

If sufficient load is added to the vehicle, then the sprung mass 26 will be displaced downward (viewing FIG. 1) toward the unsprung mass 28, thus compressing load leveling strut 14. Upon sufficient compression of strut 14 outer strut housing 38 will move downward (viewing FIGS. 1 and 2) relative to inner strut housing 30 so that roller 116 engages surface 95 of cam member 92. This engagement forces roller 116 and plunger 112 away from strut 14 and closes switch 104. By adjusting the axial length of groove 96 and the separation of switches 102 and 104 it would be possible to assure that only switch 104 is closed upon the compression of strut 14. Since switch 102 is open, solenoid 90 is deactivated and valve 86 remains closed under the influence of spring 89. The closing of switch 104 actuates solenoid 82 which moves spool valve 74 leftward viewing FIG. 1 to the second position (not shown) wherein land 79 restricts flow between passages 59 and 61, thus raising the fluid pressure in slot 67. This increased fluid pressure is communicated with second chamber 70 and communication is closed between reservoir 62 and second chamber 70, as described previously. As a result, the increased fluid pressure in second chamber 70 moves piston 66 to the left (viewing FIG. 1) against the bias of spring 69 to thereby force leveling fluid out of first chamber 68 and into strut chamber 42 to extend strut 14. Leveling fluid continues to flow into strut chamber 42 to extend strut 14 until strut 14 it returns to the neutral position shown in FIG. 2. Once the strut 14 is returned to the neutral position, further extension is prevented as hereinbefore described.

If sufficient load is removed from the vehicle, then the sprung mass 26 will be displaced upward (viewing FIG. 1) away from the unsprung mass 28, thus extending strut 14 from its neutral position illustrated in FIG. 2. Upon sufficient extension of strut 14 outer strut housing 38 will move upward (viewing FIGS. 1 and 2) relative to inner strut housing 30 so that roller 114 engages surface 94 of cam member 92. This engagement forces roller 114 and plunger 110 away from strut 14, closing switch 102 and actuating solenoid 90. Switch 104 remains open so that solenoid is deactivated. Actuated solenoid 90 opens valve 82 to permit the flow of leveling fluid from chamber 42 of strut 14 into first chamber 68 of load leveling fluid source 16. Deactivated solenoid 82 allows spool valve 74 to be held in the first position under the influence of spring 80 wherein second chamber 70 is communicated with reservoir 62 and wherein communication is closed between second chamber 70 and pump 63. As a result, the reservoir fluid pressure is communicated to the second chamber 70 to allow piston 66 to move to the right, viewing FIG. 1, so that leveling fluid may flow out of strut chamber 42, through open valve 86, and into first chamber 68. Strut 14 compresses under the weight of the unsprung mass 26 as leveling fluid flows out of chamber 42. The compression of strut 14 continues until strut 14 returns to the neutral position as shown in FIG. 1. Once strut 14 has returned to the neutral position, further transfer of leveling fluid is prevented as hereinbefore described until a change in the vehicle load again compresses or extends the strut 14. In this manner, the load-leveling system 10 tends to maintain a substantially constant separation between the sprung and unsprung masses 26 and 28 by maintaining the strut 14 in a neutral position.

A modification (not shown) of this system is possible wherein the piston 66 is eliminated and wherein the fluid in chamber 70 is communicated directly to the load leveling strut 14 via valve assembly 86 and passage 49.

I claim:

1. A load-leveling mechanism for controlling the separation of a sprung mass and an unsprung mass of a vehicle, the load-leveling mechanism comprising:

a source of fluid pressure;

a fluid-receiving extendible strut connected between the masses for controlling the separation of the masses depending upon the fluid pressure within the strut;

a housing defining a first chamber communicated with the fluid pressure source and with a fluid reservoir and defining a second chamber communicated with the first chamber and with the strut;

first valve means for controlling communication between the second chamber and the strut;

first servo means for operating the first valve means;

second valve means movable within the first chamber for controlling communication of the second chamber with the reservoir and with the fluid pressure source;

second servo means for operating the second valve means; and sensor means for sensing the separation of the masses and operatively connected to the first and second servo means, the sensor means and the first and second servo means cooperating with the first and second valve means to control the fluid pressure within the extendible strut to thereby maintain the separation of the sprung and unsprung masses substantially within a predetermined range.

2. The load leveling mechanism of claim 1, further comprising:

a piston disposed within the second chamber and dividing the second chamber into an inlet chamber communicated with the first chamber and an outlet chamber communicated with the strut via the first valve means, the piston moving to control the fluid pressure in the strut in response to the fluid pressure in the inlet chamber.

3. The load leveling mechanism of claim 1, wherein the strut comprises a strut housing connected to one of the masses and defining a bore therewithin, a piston slidable within the bore and connected to the other mass, a diaphragm slidably mountd in the bore, the piston and one side of the diaphragm cooperating to define a leveling chamber therebetween communicated via the first valve means with the second chamber, and resilient means disposed between the strut housing and the other side of the diaphragm for urging the diaphragm toward the piston.

4. The load-leveling mechanism of claim 3, wherein: the piston and rod define a bore extending therethrough, the bore communicating the leveling chamber with the second chamber via the first valve means.

5. The load-leveling mechanism of claim 3, wherein the resilient means comprises a compressible gas confined between the housing and the other side of the diaphragm.

6. The load-leveling mechanism of claim 1, wherein: the sensor means comprises a first switch operatively connected to the first servo means, the first switch closing in response to extension of the strut to actuate the first servo means, the first valve means opening in response to actuation of the first servo means to permit flow of fluid out of the strut to permit compression of the strut, and a second switch operatively connected to the second servo means, the second switch closing in response to compression of the strut to actuate the second servo means, the second valve means opening in response to actuation of the second servo means to permit flow of fluid from the fluid source into the strut to extend the strut.

7. The load-leveling mechanism of claim 1, wherein the source of leveling fluid comprises a power steering pump.

8. The load-leveling mechanism of claim 6, wherein: the first servo means comprises a solenoid; and the first valve means comprises a check valve for permitting one-way flow of fluid from the source to the strut, and a solenoid-controlled valve operatively connected to the solenoid, the controlled valve preventing flow of fluid from the source to the strut unless the first switch is closed, the solenoid moving the controlled valve in response to the closing of the first switch to permit flow of leveling fluid from the strut to the reservoir.

9. The load-leveling mechanism of claim 1, wherein: the sensor means comprises a cam member fixed relative to one of the masses and comprising first and second cam surfaces thereon with a third cam surface therebetween a first switch operatively connected to the first servo means, fixed relative to the other mass and operatively engageable with the first cam surface upon extension of the strut, the first switch closing in response to engagement with the first cam surface to actuate the first servo means, and a second switch operatively connected to the second servo means, fixed relative to the other mass and operatively engageable with the second cam surface upon compression of the strut, the second switch closing in response to engagement with the second cam surface to actuate the second servo means, the first and second switches being engageable with the third cam surface when the strut is in a neutral position, the first and second switches opening in response to engagement with the third cam surface.

10. The load-leveling mechanism of claim 9, wherein: the strut comprises a strut housing connected to the one mass and defining a bore therewithin, a piston slidable within the bore and connected to the other mass, a diaphragm slidably mounted in the bore, the piston and one side of the diaphragm cooperating to define a leveling chamber therebetween communicated with the second chamber and resilient means disposed between the strut housing and the other side of the diaphragm for urging the diaphragm toward the piston; and the cam member is mounted on the strut housing.

* * * * *